UNITED STATES PATENT OFFICE.

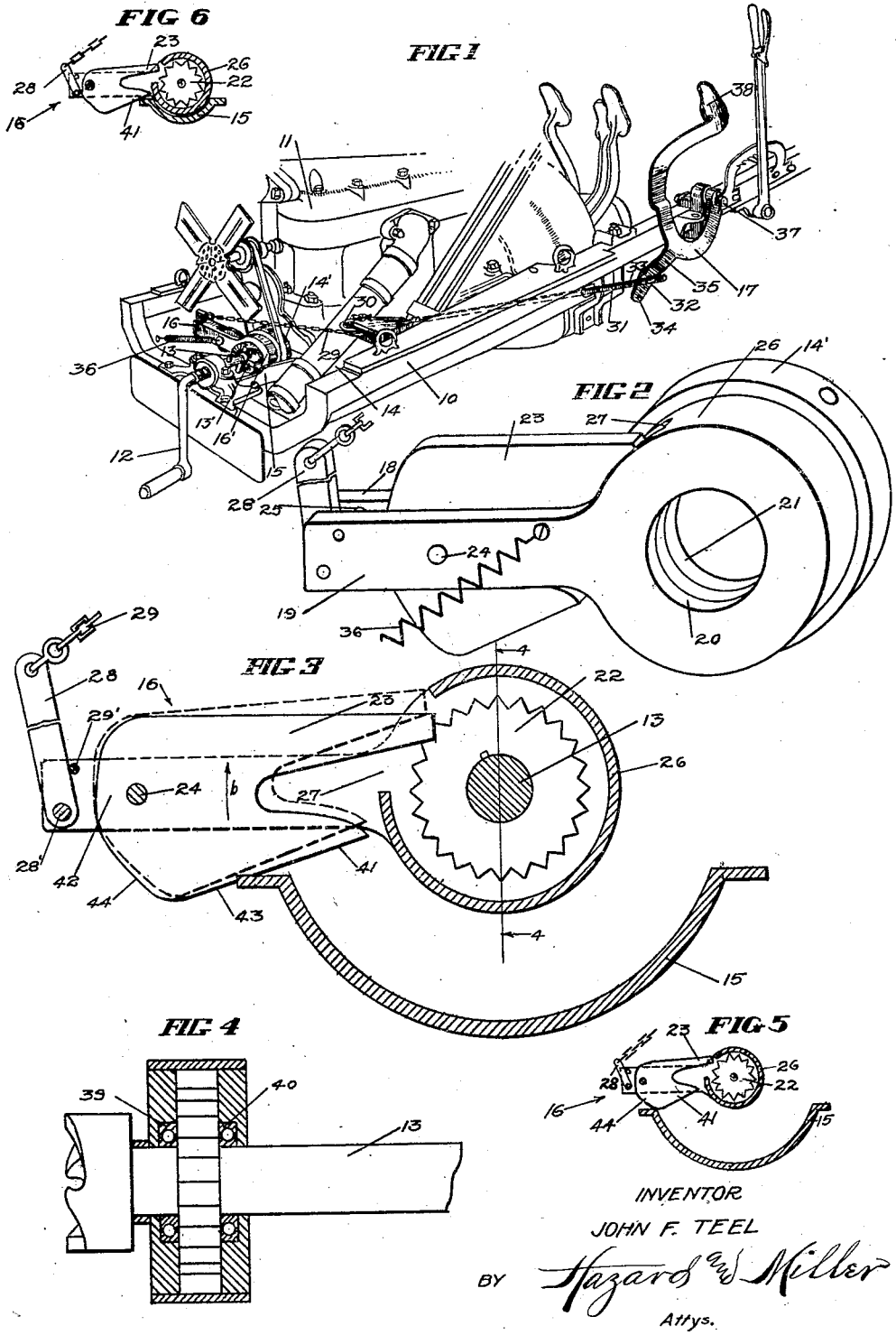
J. F. TEEL.
RATCHET MECHANISM FOR ENGINE STARTERS.
APPLICATION FILED JULY 26, 1917.
1,275,627.
Patented Aug. 13, 1918.
INVENTOR
JOHN F. TEEL
BY Hazard & Miller
Attys.

JOHN F. TEEL, OF LOS ANGELES, CALIFORNIA.

RATCHET MECHANISM FOR ENGINE-STARTERS.

1,275,627.  Specification of Letters Patent.  Patented Aug. 13, 1918.

Application filed July 26, 1917. Serial No. 182,990.

*To all whom it may concern:*

Be it known that I, JOHN F. TEEL, a citizen of the United States, residing at Los Angeles, in the county of Los Angeles and State of California, have invented new and useful Improvements in Ratchet Mechanism for Engine-Starters, of which the following is a specification.

My object is to make a mechanical device to be operated from the driver's seat for starting Ford automobiles and the like.

Figure 1 is a perspective showing my engine starter in use upon a Ford engine.

Fig. 2 is an enlarged perspective of the cranking levers and pawl and showing the fan pulley.

Fig. 3 is an enlarged vertical cross-section on a plane parallel with the front face of Fig. 2 and showing one form of drip-pan or crank case.

Fig. 4 is a sectional detail on the line 4—4 of Fig. 3.

Fig. 5 is a view analogous to Fig. 3 and upon a reduced scale and showing a relatively larger form of drip-pan or crank case.

Fig. 6 is a view analogous to Figs. 3 and 5 and showing a still smaller drip-pan or crank case.

The frame 10 supports the engine 11. The engine 11 has the usual starting crank 12. The engine crank shaft 13 extends outwardly from the crank case 14 through the belt pulley 14' and carries the usual clutch 13' upon its extreme forward end to be engaged by the clutch teeth of the starting crank 12.

My starter 16' fits upon the crank shaft 13 between the clutch 13' and the fan pulley 14'.

The shield 15 is an extension from the bottom of the crank case and in the old Fords this shield fits so close to the crank shaft 13 that there is barely room to get the starter in place upon the crank shaft as shown in Fig. 6. In the new Fords there is a shield or drip-pan considerably larger in cross-section, leaving more space between the shaft 13 and the shield, as shown in Figs. 3 and 5. In constructions where this shield is not formed integral with the crank case a drip-pan is inserted.

The cranking lever 16 is formed or built with parallel arms 18 and 19 extending outwardly from bearings 20 and 21. The ratchet wheel 22 is mounted between the bearings 20 and 21 and fixed upon the crank shaft 13, and the starting pawl 23 is mounted upon a pivot pin 24 in the slot 25 between the arms 18 and 19. An annular web 26 connects the bearings 20 and 21 around the ratchet wheel 22, there being an opening 27 through the web for the point of the pawl 23. An extension link 28 is pivotally mounted in the slot 25 between the extreme outer ends of the arms 18 and 19 upon a pin 28', and a stop pin 29' is inserted through the arms 18 and 19 above the pin 28' in front of the link 28 so as to hold the link from swinging inwardly. The draw-chain 29 is connected to the upper end of the link 28 and passes directly across the machine and around the guide pulley 30 and then backwardly to the draw-bar 31. The foot-lever 17 is pivotally mounted upon the frame 10 in convenient relation to the other foot-levers. The foot-lever is mounted upon the pivot 37 and is a rigid bar extending radially upon a curved line and then concentrically to the foot-pedal 38. The lever arm 35 extends radially from the lower end of the concentric portion of the foot-lever 17 and a series of perforations 33 is formed through the draw-bar 31 and a corresponding series of perforations 34 is formed through the lever extension 35 so that the pin 32 may be inserted through desired ones of the perforations 33 and 34 to adjust the connection between the pedal 38 and the link 28.

Ball bearings 39 and 40 may be used in mounting the bearings 20 and 21 upon the crank shaft, as shown in Fig. 4.

Normally the cranking lever 16 lies horizontally and rests upon the frame 10. A retractile coil spring 36 connects the cranking lever to the frame, the tension of the spring being exerted to swing the cranking lever 16 to its normal position.

The end of the pawl 23 falls through the opening 27 and engages the teeth of the ratchet 22 when the foot-pedal is pressed forwardly to crank the engine. The pawl 23 is a comparatively long heavy bar and the pivot 24 is a considerable distance from the crank shaft 13 so as to make a strong construction.

The throw-off finger 41 extends downwardly and inwardly from the head 42 of the pawl, the point of the finger being near to the periphery of the web 26. The lower face 43 of the finger 41 extends downwardly and outwardly from the point and the cam face 44 is curved and extends from the outer end of the straight face 43 outwardly and upwardly to the outer face of the head 42. In the old Ford machines the extension or shield 15 fits closely around the periphery of the bearings 20 and 21, as shown in Fig. 6, and the lower face 43 of the finger 41 will strike the edge of this shield when the spring 36 returns the cranking lever to its normal position, thereby raising the pawl 23 out of engagement with the ratchet 22 so that as the engine runs the pawl will not drag upon the ratchet wheel and so that if the engine back-fires in starting the backward swing of the cranking lever 16 will strike the finger 41 against the shield 15 and knock the pawl 23 out of engagement with the ratchet teeth. If the shield 15 is larger in cross-section, as shown in Fig. 3, the edge of the shield will strike the surface 43 along its center, as shown in Fig. 3, and if the shield or drip-pan is very large, as shown in Fig. 5, the cam face 44 will strike the inner corner of the shield, as shown in Fig. 5. The finger 41 and the cam 44 are formed integral with the pawl 23 of heavy and strong material so as to stand this back action and provide against breaking the parts by back-firing.

Especial attention is called to the fact that the link pin 28', the pivot pin 24, and the contacting end of the pawl 23 are substantially in a straight line when in action, as in Fig. 3, the working face of the pawl being at right angles to this straight line, and that the contacting faces of the teeth upon the ratchet wheel 22 are substantially at right angles to this straight line when a tooth is in contact with the end of the pawl. This feature is important in order that the pawl may be driven out of engagement with the tooth when the engine back-fires.

I claim:

1. A starter for internal combustion engines, comprising a ratchet wheel fixed upon the crank shaft of an engine, a bifurcated cranking lever having bearing portions rotatably mounted upon the crank shaft at opposite sides of the ratchet wheel, a pawl pivotally mounted in the bifurcation of the cranking lever in position to engage the ratchet wheel, a cam finger extending from the pawl and adapted to engage a rigid part of the engine when the cranking lever swings backwardly to its normal position, so as to raise the pawl out of engagement with the ratchet wheel, a link fitting between the bifurcated portions of the cranking lever, and a link pin pivotally connecting the link to the cranking lever; the link pin, the pawl pivot, and the contacting face of the pawl being substantially in a straight line and the contacting face being at substantially a right angle to this straight line and the contacting faces of the ratchet wheel teeth being at substantially right angles to the straight line when in contact with the pawl.

2. A starter for internal combustion engines, comprising a ratchet wheel fixed upon the crank shaft of an engine, a bifurcated cranking lever having bearing portions rotatably mounted upon the crank shaft at opposite sides of the ratchet wheel, a pawl pivotally mounted in the bifurcation of the cranking lever in position to engage the ratchet wheel, a cam finger extending from the pawl and adapted to engage a rigid part of the engine when the cranking lever swings backwardly to its normal position, so as to raise the pawl out of engagement with the ratchet wheel, a link fitting between the bifurcated portions of the cranking lever, a link pin pivotally connecting the link to the cranking lever, and a stop for the link to hold the link at an angle to the cranking lever; the link pin, the pawl pivot, and the contacting face of the pawl being substantially in a straight line and the contacting face being at substantially a right angle to this straight line and the contacting faces of the ratchet wheel teeth being at substantially right angles to the straight line when in contact with the pawl.

In testimony whereof I have signed my name to this specification.

JOHN F. TEEL.